US012584376B2

(12) United States Patent
Walther et al.

(10) Patent No.: US 12,584,376 B2
(45) Date of Patent: Mar. 24, 2026

(54) DEBRIS SHIELD FOR BALL VALVE ACTUATION

(71) Applicant: Schlumberger Technology Corporation, Sugar Land, TX (US)

(72) Inventors: Brian Walther, Rosharon, TX (US); Bo Chen, Rosharon, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/216,270

(22) Filed: May 22, 2025

(65) Prior Publication Data

US 2025/0361786 A1     Nov. 27, 2025

Related U.S. Application Data

(60) Provisional application No. 63/650,481, filed on May 22, 2024.

(51) Int. Cl.
| | |
|---|---|
| *E21B 34/06* | (2006.01) |
| *F16K 5/06* | (2006.01) |

(52) U.S. Cl.
CPC ............ *E21B 34/06* (2013.01); *F16K 5/0647* (2013.01); *E21B 2200/04* (2020.05)

(58) Field of Classification Search
CPC .... E21B 2200/04; E21B 34/06; E21B 34/066; E21B 34/12; E21B 34/125; E21B 34/14
See application file for complete search history.

(56)                References Cited

U.S. PATENT DOCUMENTS

| | | | |
|---|---|---|---|
| 2011/0203801 A1* | 8/2011 | Azimi | E21B 34/142 |
| | | | 166/332.3 |
| 2013/0206417 A1* | 8/2013 | Kalb | E21B 34/06 |
| | | | 166/332.3 |
| 2021/0388694 A1* | 12/2021 | Elston | E21B 34/14 |

* cited by examiner

*Primary Examiner* — Kristyn A Hall
(74) *Attorney, Agent, or Firm* — Jeffrey D. Frantz

(57)                ABSTRACT

An isolation valve system includes a well string having an isolation valve including a rotatable ball for rotation about a fixed axis. The isolation valve has an extension mandrel and a connecting mandrel disposed above the rotatable ball. The isolation valve has a debris sleeve designed to push debris inward and upward in the extension mandrel accumulated above the rotatable ball when the ball is rotated to alleviate the friction force of the debris acting on the rotating ball.

16 Claims, 3 Drawing Sheets

DEBRIS SHIELD FOR BALL VALVE ACTUATION

BACKGROUND

An isolation valve is a device that provides isolation to a reservoir. Isolation valves safeguard reservoirs by providing a reliable barrier within the completion tubing string. Specifically, a formation isolation valve is downhole completion equipment that is used to provide two-way isolation from the formation. This double isolation allows the performance of completion operations without placing a column of heavy fluid in the wellbore to prevent the production of reservoir fluids. Isolation valves may utilize a ball valve as the primary barrier mechanism.

A challenge all isolation valves must mitigate is operating in dirty, debris laden environments. Dirt, debris, particulates, or any foreign material in the valve have a significant impact on the valve's performance. Specifically, foreign material in the valve increases friction between the internal components of the actuation mechanism of the valve and hinders the valve's ability to open/close and seal. During actuations of the ball valve, the added friction requires the operator to apply more force to the valve's actuation mechanism to overcome the friction. In some cases, the force to overcome the friction can be extreme and can exceed the operator's equipment rating or the isolation valve rating (i.e., the valve cannot open or close because the other equipment used to open/close the valve cannot apply enough force). Consequently, debris is a primary cause of failure for isolation valves and ball valves generally.

Isolation valves have achieved reliable performance with the dramatic negative effects of debris that accumulates on top of the closed ball valve. The debris on top of the isolation valve would create a debris plug within a mandrel above the ball valve. Isolation valves in the past were designed to push the mandrel and debris plug down when trying to open the ball valve, thus increasing friction force. Accordingly, there is a need for an actuation mechanism for ball valves with a more robust design for actuating the ball valve in unclean, debris laden environments, wherein the debris does not increase the force required to rotate the ball valve by moving the debris plug away from the ball valve while rotating the ball valve.

SUMMARY

According to one or more embodiments of the present disclosure, an isolation valve comprising a housing; a rotatable ball with the housing; an extension mandrel; a connecting mandrel connected to a lower end the extension mandrel and operable to rotate a ball valve between a closed position and open position; a debris sleeve positioned within the extension mandrel and the connecting mandrel above a ball valve. The extension sleeve and connecting mandrel can move linearly and the debris sleeve is stationary. The connection between the extension sleeve and connecting mandrel does not allow debris to enter the annulus created by the extension sleeve connected to connecting mandrel and the housing.

According to one or more embodiments of the present disclosure, a bevel on the extension sleeve and a bevel on the debris sleeve for the purpose of moving the debris inward and upward within the extension valve, wherein the bevel on the extension sleeve and the bevel on the debris sleeve are ramped surfaces. The isolation valve has an upper cage and a lower cage with the ball between the upper cage and the lower cage; wherein the debris sleeve is connected to the upper cage. The isolation valve has a seal disposed along one end of the ball and the seal is contained in a seal retainer which helps to maintain the seal in contact with the ball.

A method of reducing a friction force of debris acting isolation valve comprising: positioning the isolation valve with a rotatable ball within a well; accumulating debris above the ball when the ball is in a closed position; wherein the debris is accumulated in a debris sleeve and an extension sleeve; and wherein actuation the rotatable ball causes the debris in the debris sleeve and the extension sleeve to move inward and upward within the extension sleeve reducing the friction force of debris on above the rotatable ball. The extension sleeve has a bevel and the debris sleeve has a bevel that causes the debris to move inward and upward within the extension sleeve when the extension sleeve is moved linearly downhole. A connecting sleeve is connected to the extension sleeve and the rotatable ball; wherein linear movement of the connecting sleeve will move the extension sleeve and rotate the ball.

According to one or more embodiments of the present disclosure, to reduce the force required to open the formation isolation valve ball in heavy debris environment, a debris shield positioned directly above the closed ball valve allows debris to accumulate on top of the ball valve without directly impacting the force required for the mandrels above to translate down to open the ball valve. The debris shield is an inner sleeve.

BRIEF DESCRIPTION OF THE DRAWINGS

Certain embodiments of the disclosure will hereafter be described with reference to the accompanying drawings, wherein reference numerals denote like elements. It should be understood, however, that the accompanying figures illustrate the various implementations described herein and are not meant to limit the scope of various described technologies. The drawings are as follows.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect," "connection," "connected," "in connection with," and "connecting," are used to mean "in direct connection with," in connection with via one or more elements." The terms "couple," "coupled," "coupled with," "coupled together," and "coupling" are used to mean "directly coupled together," or "coupled together via one or more elements." The term "set" is used to mean setting "one element" or "more than one element." As used herein, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. Commonly, these terms relate to a reference point at the surface from which drilling operations are initiated as being the top point and the total depth being the lowest point, wherein the well (e.g., wellbore, borehole) is vertical, horizontal, or slanted relative to the surface.

Figure 1:
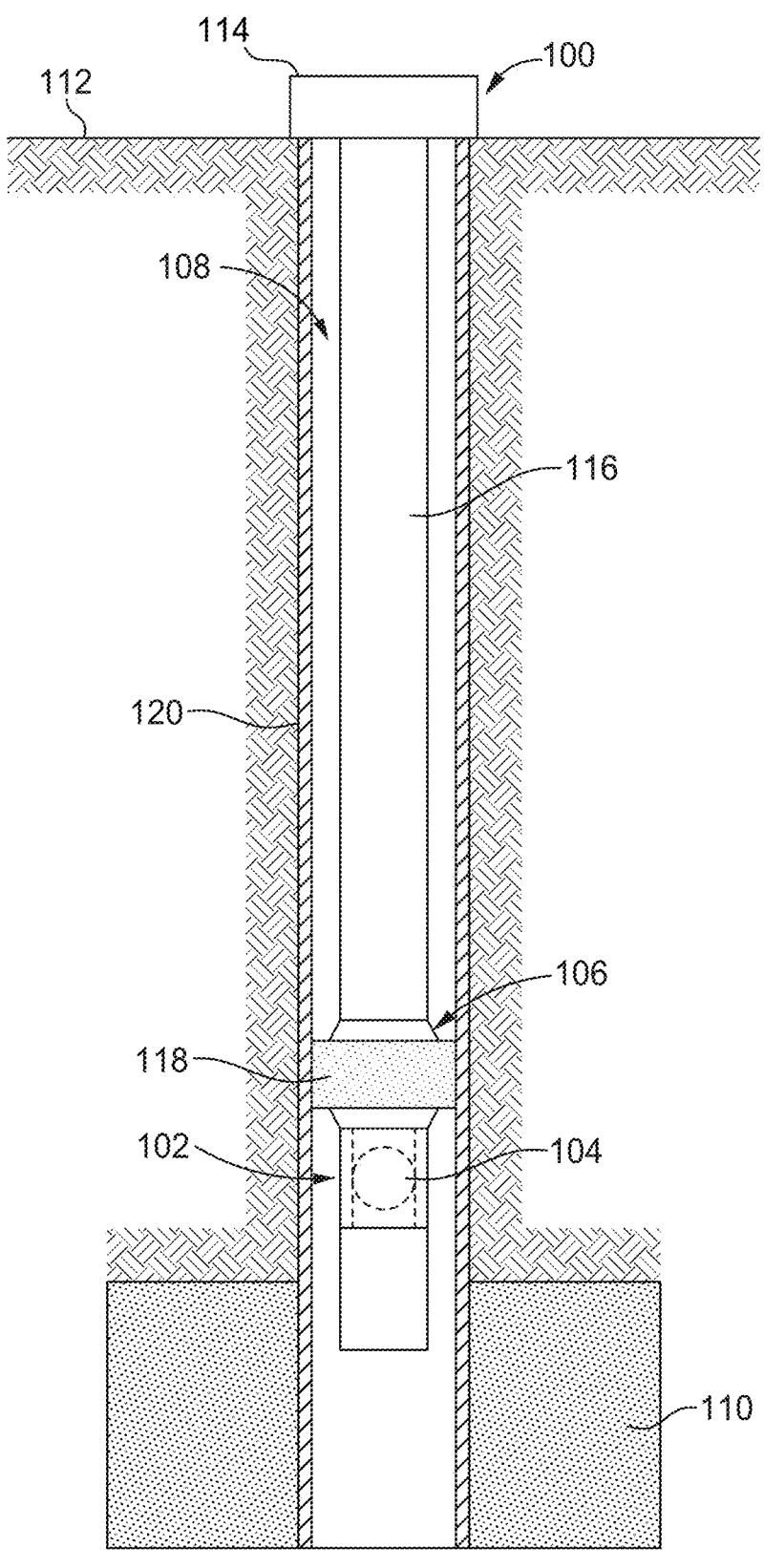
FIG. 1 is a schematic view of a well system having an isolation valve deployed in a wellbore, according to one or more embodiments of the present disclosure.

Referring generally to FIG. 1, an example of a well system 100 is illustrated as employing an isolation valve system 102 comprising at least one isolation valve 104. Well system 100 may comprise a completion 106 or other downhole equipment that is deployed downhole in a wellbore 108. The isolation valve 104 may be one of a wide variety of components included as downhole equipment 106. Generally, the wellbore 108 is drilled down into or through a formation 110 that may contain desirable fluids, such as hydrocarbon-based fluids. The wellbore 108 extends down from a surface location 112 beneath a wellhead 114 or other surface equipment suitable for the given application.

Depending on the specific well application, e.g., such as a well perforation application, the completion/well equipment 106 is delivered downhole via a suitable well string 116, e.g., a well completion string. However, the well string 116 and the components of completion 106 often vary substantially. In many applications, one or more packers 118 is used to isolate the annulus between downhole equipment 106 and the surrounding wellbore wall, which may be in the form of a liner or casing 120. The isolation valve 104 may be selectively actuated to open or isolate formation 110 with respect to flow of fluid through completion 106.

Figure 2:
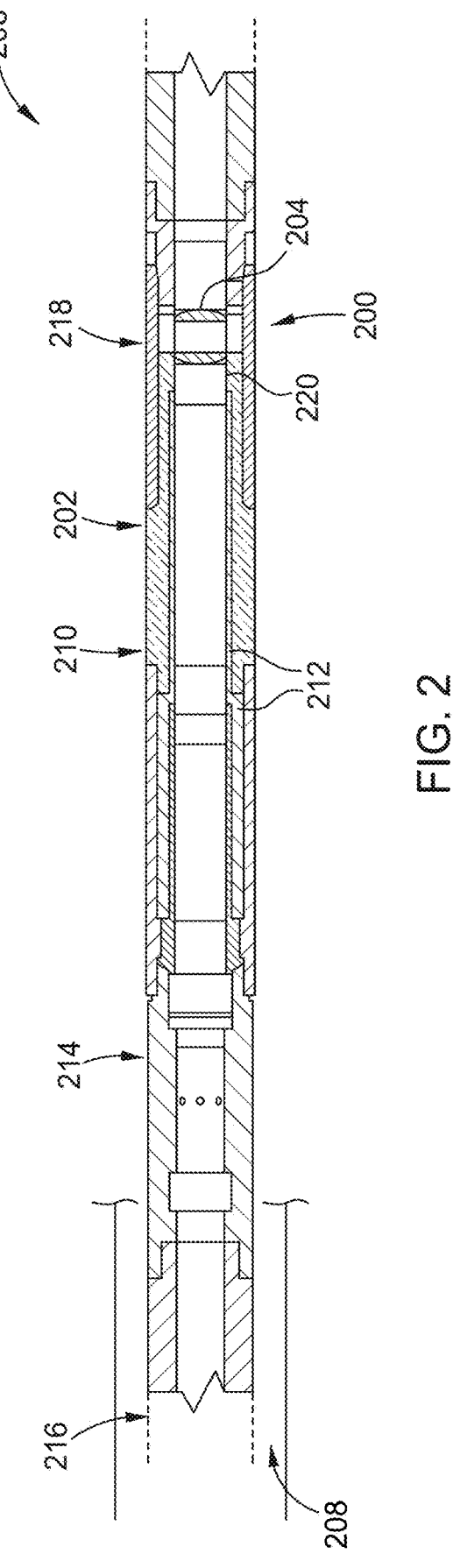
FIG. 2 is a cross-sectional view of an example of a well string deployed in a wellbore and combined with an isolation valve, according to one or more embodiments of the present disclosure.

Referring now to FIG. 2, an example of a completion 206 is illustrated. The completion 206 may include a well string 216 deployed in a wellbore 208 or other type of borehole. The completion 206 also may include an actuatable device 200, which may be selectively actuated between operational positions in response to a controlled signal. For example, the controlled signal may be supplied from the surface and down through well string 216 to initiate actuation of device 200. Specifically, in one or more embodiments of the present disclosure, the controlled signal may be conveyed through a column of fluid inside the well string 216, for example. In one or more embodiments of the present disclosure, the nature of the controlled signal may be electric, electromagnetic, acoustic, optic, chemical, a series of pressure pulses, a pressure differential, and/or a temperature differential, for example.

The actuatable device 200 according to one or more embodiments of the present disclosure may be part of an isolation valve 202 disposed along the well string 216. For example, the actuatable device 200 may be in the form of a ball valve element 204 or another type of actuatable valve element. According to the illustrated embodiment, the isolation valve 202 may include a ball section 218, which includes the ball valve element 204 rotatably mounted in a corresponding ball section housing 220. In one or more embodiments of the present disclosure, the ball valve element 204 may rotate open or closed with special seals to secure effective isolation along an interior of the well string 216 and to prevent entry of unwanted debris.

Still referring to FIG. 2, the ball valve element 204 (or other actuatable device) may be shifted between operational positions via a mechanical section 210 coupled with the ball section 218. According to one or more embodiments of the present disclosure, the mechanical section 210 may include a mechanical linkage 212 connected to the ball valve element 204 or another actuatable device. According to one or more embodiments of the present disclosure, the mechanical linkage 212 may include a mechanical shifting profile and a position-lock collet, for example. The mechanical section 210 and mechanical linkage 212 are operatively coupled with the trigger system 214, which includes a remote opening mechanism that responds to a controlled signal to cause shifting of, for example, mechanical linkage 212 and ball valve element 204. In one or more embodiments of the present disclosure, the trigger system 214 may be a redundant trigger system as further described below. By way of example, the trigger system 214 may be used to shift the ball valve element 204 from a closed position to an open position via the controlled signal applied from the surface or other suitable location, according to one or more embodiments of the present disclosure.

Figures 3, 4:
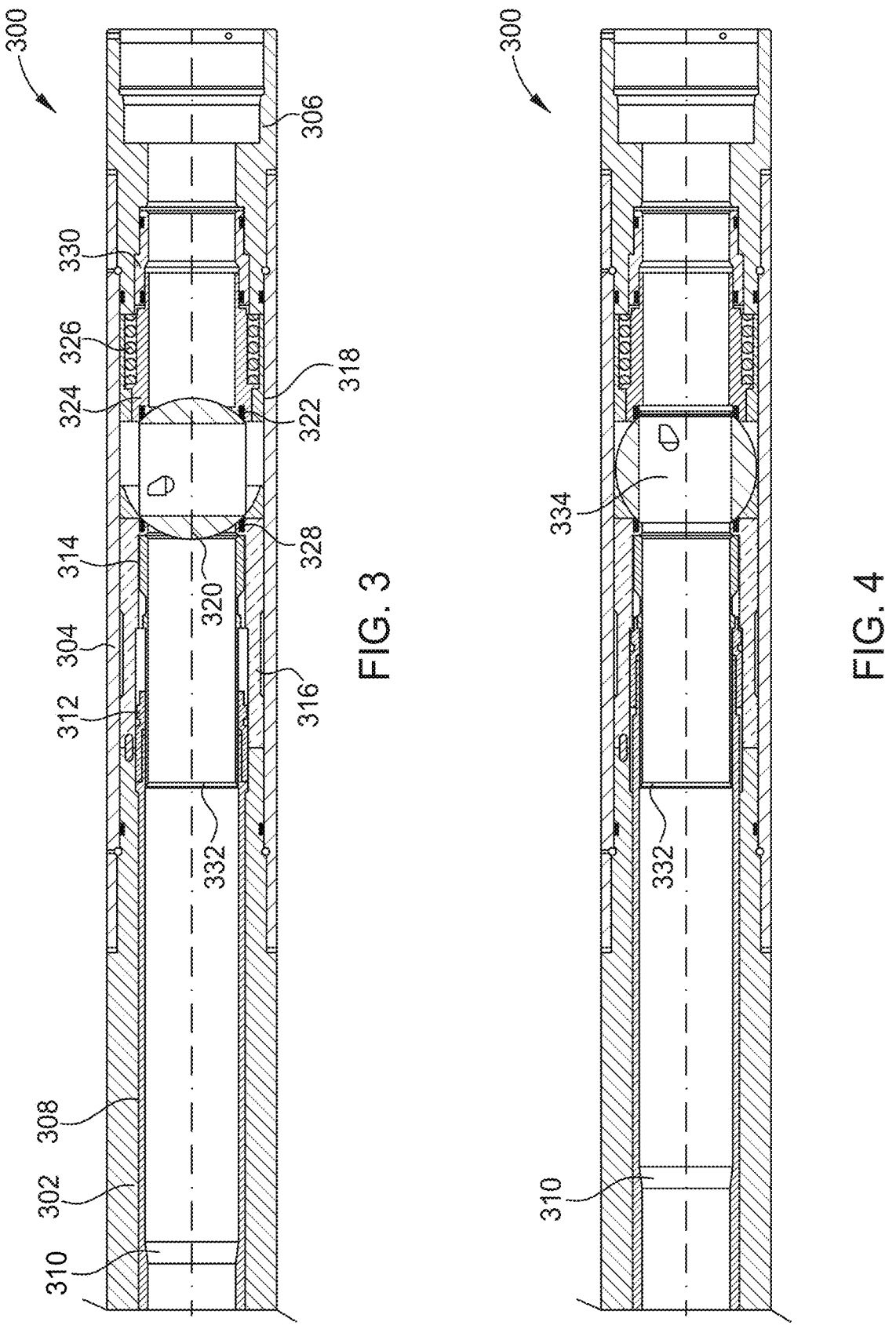
FIG. 3 is a cross-sectional view of an isolation valve in a closed position, according to one or more embodiments of the present disclosure.
FIG. 4 is a cross-sectional view of an isolation valve in an open position, according to one or more embodiments of the present disclosure.

Turning now to FIG. 3, FIG. 3 is a cross-sectional view of an isolation valve 300, according to one or more embodiments disclosed. The isolation valve 300 has a housing. The housing includes an upper housing 302, an intermediate housing 304 and a lower housing 306. Although the isolation valve 300 has three housing sections, the housing can be made of one or more housing sections. Within the upper housing 302 and intermediate housing 304 is an extension mandrel 308. The extension mandrel 308 has a first diameter and a second diameter. A bevel 310 separates the first diameter from the second diameter. The bevel 310 is an angled section of the extension mandrel 308 that creates a ramped surface. The first diameter of the extension mandrel 308 is above the bevel 310 and the second diameter is below the bevel 310. The first diameter is smaller than the second diameter.

Adjacent to the extension mandrel 308 is a connecting mandrel 312 and a debris sleeve 314. The connecting mandrel 312 and the debris sleeve 314 are in the inner diameter of the intermediate housing 304. As shown in FIG. 3, the debris sleeve 314 is positioned at least partially within the extension mandrel 308 and the connecting mandrel 312 to act as a debris shield for the isolation valve 300. The debris sleeve 314 is stationary and does not move. The upper end of the debris sleeve 314 extends within the lower end of the extension mandrel 308 creating an overlap portion. The overlapped portion of the debris sleeve 314 and extension mandrel 308 has a small gap to prevent debris from entering between the outer diameter of the debris sleeve 314 and the extension mandrel 308. The upper portion of the debris sleeve 314 has a bevel 332. The bevel 332 upper end has a wider diameter than the lower end creating a ramped surface. The bevel 332 of the debris sleeve 314 pushes debris plug up instead of down into a rotating ball 320. Pushing the debris upward reduces the friction force on the rotating ball 320. The connecting mandrel 312 is utilized to open the isolation valve 300. The connecting mandrel is connected to the extension mandrel 308. Additionally, the connecting mandrel 312 is connected to yoke arms (not illustrated). The yoke arm is attached to the connecting mandrel 312 at one end and the ball valve at the opposite end. Linear movement of connecting mandrel 312 through valve housing will cause the yoke arm to rotate ball 320 between open and closed positions as illustrated in FIGS. 3 and 4. Furthermore, movement of the connecting mandrel 312 will cause the extension mandrel 308 to move linearly within the housing. The connecting mandrel 312 translates down during actuation open of the isolation valve 300, as illustrated in FIG. 4. The connecting mandrel 312 is protected from the debris inside an annulus created by the outer surface of the connecting mandrel 312 and the outer surface of debris sleeve 314 and the inner surface of the housing.

The isolation valve 300 includes an upper cage 316 and a lower cage 318 with a ball 320 between the upper cage 316 and the lower cage 318. The upper cage 316 and the lower cage 318 are stationary. The debris sleeve 314 is connected to the upper cage 316. The rotating ball 320 in FIG. 3 is in a closed position. The ball 320 is a valve that can be opened and closed by moving internal components. The ball 320 has a through hole 334, that allows fluid flow when the ball 320 is rotated to an open position. When the ball 320 is rotated to a closed position flow is blocked through an interior of the isolation valve 300.

The ball 320 as illustrated is contacted by a seal 322 disposed along one end of ball 320. The seal 322 is contained in a seal retainer 324, which helps to maintain the seal 322 in contact with the ball 320. According to one or more embodiments, seal retainer 324 may be biased against one end of the ball 320 due to a resilient member 326 provided within a cavity defined by the seal retainer 324 and the lower cage 318. In one or more embodiments, resilient member 326 may be one or more wave springs, or another type of spring, for example. Placement of the resilient member 326 between the seal retainer 324 and the lower cage 318 allows for a more uniform continuous internal diameter through the isolation valve 300. Additionally, this configuration may contribute to the debris tolerance of the isolation valve 300 due to the separation of the resilient member 326 from the general flow stream of an open ball 320 within the isolation valve 300.

Referring to FIG. 3, a wiper 328 may be deployed against ball 320 to wipe the ball 320 of debris as the ball 320 is rotated and to thereby reduce the chance of debris preventing rotation of the ball 320. The seal 322 and wiper 328 cooperate to facilitate dependable and repeatable motion of ball 320 as the ball 320 is rotated. As further shown in FIG. 3, a seal follower 330 or floating piston may assist the seal retainer 324 with maintaining the seal 322 in contact with the ball 320. In this way, the seal mechanism according to one or more embodiments utilizes the seal follower 330 to apply a booster force on the seal retainer 324. As shown in FIG. 3, the seal follower 330 moves up against the seal retainer 324 when there is pressure below the ball 320. This generates a force on the seal retainer 324.

In operation, debris will fill the bore of the debris sleeve 314 and extension mandrel 308 above the ball 320. With an accumulation of debris above the ball 320, the overlap between the debris sleeve 314 and the extension mandrel 308 prevents debris from entering behind the debris sleeve 314. During the actuation of rotating the ball 320, the connecting mandrel 312 translates down to open the isolation valve 300. The connecting mandrel 312 is protected from pushing down into the debris above the ball 320 by the debris sleeve 314. The debris sleeve 314 is stationary and does not move while the ball 314 is rotated. To rotate the ball 320 to an open position, the extension mandrel 308, connecting mandrel 312 and yoke arms are moved linearly downhole. The debris sleeve 314 and housing remains stationary. The debris in the bore of the debris sleeve 314 and extension mandrel 308 is compressed inwardly and moves upwardly within the bore of the extension mandrel 308 by the bevel 310 on the extension mandrel 308 and the bevel 332 on the debris sleeve 314. The bevel 332 on the debris sleeve 314 will push the debris in the extension mandrel 308 upward and the bevel 310 on the extension mandrel 308 will push the debris inward. Moving the debris inward and upward inside the extension mandrel 308 will decrease the pressure and friction of the debris acting on the rotating ball 320.

The isolation valve 300 can be actuated between an open and closed position and the debris accumulated above the ball valve when the valve is closed will move accordingly with the help of the bevels 310, 332 as the extension mandrel 308 is moved downhole. Traditionally, the ball valve will require additional force to rotate the ball 320, due to the accumulation of debris above the valve. However, moving the debris inward and upward within the extension valve by the bevel 332 on the debris sleeve 314 and the bevel 310 on the extension mandrel 308 will alleviate the additional force required to rotate the ball 320.

Although embodiments of the present disclosure have been described with respect to isolation valves, embodiments of the present disclosure may also be used in any product utilizing a ball valve in a debris laden environment.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An isolation valve comprising:
   a housing;
   a rotatable ball disposed in the housing;
   an upper cage disposed in the housing and adjacent the ball;
   an extension mandrel;
   a connecting mandrel disposed in the upper cage, the connecting mandrel connected to a lower end of the extension mandrel and operable to rotate the ball valve between a closed position and open position; and
   a debris sleeve positioned within the extension mandrel and the connecting mandrel above the ball.

2. The isolation valve of claim 1, wherein the extension mandrel and connecting mandrel can move linearly and the debris sleeve is stationary.

3. The isolation valve of claim 1, wherein a connection between the extension mandrel and connecting mandrel does not allow debris to enter an annulus created by the extension mandrel connected to the connecting mandrel and the housing.

4. The isolation valve of claim 1, further comprising a first bevel on the extension mandrel and a second bevel on the debris sleeve, the first and second bevels configured to move debris inward and upward within the extension mandrel, wherein the bevel on the extension mandrel and the bevel on the debris sleeve are ramped surfaces.

5. The isolation valve of claim 1, further comprising a lower cage, the ball disposed between the upper cage and the lower cage, the debris sleeve connected to the upper cage.

6. The isolation valve of claim 1, further comprising a seal disposed along one end of the ball, the seal contained in a seal retainer configured to maintain the seal in contact with the ball.

7. The isolation valve of claim 6, wherein the seal retainer is biased against one end of the ball by a resilient member.

8. The isolation valve of claim 1, wherein the upper cage remains stationary during rotation of the ball.

9. The isolation valve of claim 8, wherein the debris sleeve is coupled to the upper cage such that the debris sleeve remains stationary during rotation of the ball.

10. The isolation valve of claim 1, further comprising a wiper coupled to the upper cage, the wiper contacting the ball.

11. A method of reducing a friction force of debris acting on an isolation valve comprising:

positioning the isolation valve with a rotatable ball within a well;

accumulating debris above the ball when the ball is in a closed position, wherein the debris is accumulated in a debris sleeve and an extension mandrel, and wherein the debris sleeve is disposed in an upper cage above the ball within a housing and extends into the extension mandrel; and actuating the extension mandrel to rotate the ball, thereby causing the debris in the debris sleeve and the extension mandrel to move inward and upward within the extension mandrel while the ball rotates.

12. The method of claim 11, wherein the extension mandrel has a first bevel and the debris sleeve has a second bevel, the first and second bevels causing the debris to move inward and upward within the extension mandrel when the extension mandrel is actuated to rotate the ball.

13. The method of claim 11, wherein the isolation valve further comprises a connecting mandrel connected to the extension mandrel and the rotatable ball;

wherein linear movement the extension mandrel moves the connecting mandrel and rotates the ball.

14. The method of claim 11, wherein the upper cage remains stationary during rotation of the ball.

15. The method of claim 14, wherein the debris sleeve is coupled to the upper cage such that the debris sleeve remains stationary during rotation of the ball.

16. The method of claim 11, further comprising a wiper coupled to the upper cage, the wiper contacting the ball.

* * * * *